(12) United States Patent
Fujiu et al.

(10) Patent No.: US 9,039,261 B2
(45) Date of Patent: May 26, 2015

(54) VEHICULAR LAMP

(71) Applicant: KOITO MANUFACTURING CO., LTD., Tokyo (JP)

(72) Inventors: Hideko Fujiu, Shizuoka (JP); Asami Nakada, Shizuoka (JP); Kazuhisa Sakashita, Shizuoka (JP); Ryujiro Ikuta, Shizuoka (JP); Kazunori Natsume, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 141 days.

(21) Appl. No.: 13/856,634

(22) Filed: Apr. 4, 2013

(65) Prior Publication Data

US 2013/0272009 A1    Oct. 17, 2013

(30) Foreign Application Priority Data

Apr. 13, 2012    (JP) ................................ 2012-092294

(51) Int. Cl.
*F21V 11/00*    (2006.01)
*F21S 8/10*    (2006.01)
*B60Q 1/00*    (2006.01)

(52) U.S. Cl.
CPC ............. *F21S 48/00* (2013.01); *F21S 48/1104* (2013.01); *F21S 48/1159* (2013.01); *F21S 48/1241* (2013.01); *F21S 48/1305* (2013.01); *F21S 48/1394* (2013.01); *F21S 48/1747* (2013.01); *F21S 48/215* (2013.01); *F21S 48/2243* (2013.01); *F21S 48/2262* (2013.01); *B60Q 1/0058* (2013.01)

(58) Field of Classification Search
USPC .................................. 362/516–518, 538, 539
See application file for complete search history.

(56) References Cited

U.S. PATENT DOCUMENTS

| | | | |
|---|---|---|---|
| 7,419,290 B2* | 9/2008 | Inaba ............................ | 362/538 |
| 7,946,743 B2* | 5/2011 | Natsume et al. .............. | 362/516 |
| 2008/0225542 A1* | 9/2008 | Mertens et al. ............... | 362/517 |
| 2008/0239744 A1* | 10/2008 | Nakada et al. ................ | 362/516 |
| 2010/0277939 A1* | 11/2010 | Komatsu et al. .............. | 362/516 |

FOREIGN PATENT DOCUMENTS

| | | |
|---|---|---|
| JP | 2010182574 | 8/2010 |
| JP | 2010267468 | 11/2010 |

OTHER PUBLICATIONS

Korean Office Action—Korean Application No. 10-2013-0037340 issued on Jan. 24, 2014, citing JP 2010-182574.

* cited by examiner

*Primary Examiner* — Evan Dzierzynski
(74) *Attorney, Agent, or Firm* — Abelman, Frayne & Schwab

(57) ABSTRACT

The present disclosure provides a vehicular lamp including a low-beam lamp and a daytime running lamp. The low-beam lamp includes a low-beam LED, a low-beam reflector, and a projection lens. The daytime running lamp includes a DRL LED, and a DRL reflector. The DRL LED is disposed at the rear side of the low-beam reflector to emit a light in a direction which intersects with the optical axis of the vehicular lamp. The DRL reflector includes an extension area that extends to at least the outer side of the projection lens when viewed from the front, and reflects the light from the DRL LED in the extension area to emit the light to the front side of the lamp through the outer side of the projection lens.

7 Claims, 6 Drawing Sheets

VEHICULAR LAMP

CROSS-REFERENCE TO RELATED APPLICATIONS

This application is based on and claims priority from Japanese Patent Application No. 2012-092294, filed on Apr. 13, 2012, with the Japanese Patent Office, the disclosure of which is incorporated herein in its entirety by reference.

TECHNICAL FIELD

The disclosure relates to a vehicular lamp, and specifically, to a vehicular lamp having a plurality of lamp units.

BACKGROUND

Conventionally, a vehicular lamp has been known which includes a plurality of lamp units such as, for example, a low-beam lamp, a high-beam lamp, a turn signal lamp, and a daytime running lamp within a lamp chamber constituted by a lamp body and a cover. See, e.g., Japanese Patent Application Laid-Open No. 2010-267468.

SUMMARY

In the vehicular lamp including the plurality of lamp units as described above, the lamp units are arranged side by side in a width direction and/or a height direction of a vehicle, and thus the vehicular lamp tends to become larger.

The present disclosure has been made in consideration of this situation and provides a small vehicular lamp including a plurality of lamp units.

To solve the above-described problem, an aspect of the present disclosure provides a vehicular lamp including a projector type lamp unit and a reflector type lamp unit. The projector type lamp unit includes a light-emitting element mounting unit for a projector type lamp configured to mount a light-emitting element for the projector type lamp, a projection lens configured to project the light from the light-emitting element for the projector type lamp to the front side, and a light shield body configured to prevent light from the outside from being incident on the projection lens. The reflector type lamp unit includes a light-emitting element mounting unit for a reflector type lamp configured to mount a light-emitting element for the reflector type lamp, and a reflector for the reflector type lamp configured to reflect the light from the light-emitting element for the reflector type lamp. The light-emitting element mounting unit for a reflector type lamp is disposed at the rear side of the light shield body such that the light-emitting element for the reflector type lamp emits light in a direction which intersects with an optical axis. The reflector for a reflector type lamp includes an extension area that extends to at least the outer side of the projection lens when viewed from the front, and reflects the light from the light-emitting element for the reflector type lamp in the extension area to emit the light to the front side of the lamp through the outer side of the projection lens.

According to the aspect, the size of the vehicular lamp in the width direction and/or the height direction of the vehicle may be decreased by arranging a plurality of lamp units having different functions side by side in the depth direction of the vehicular lamp as described above.

The vehicular lamp may further include a second reflector type lamp unit. The second reflector type lamp unit may include a light-emitting element mounting unit for a second reflector type lamp configured to mount a light-emitting element for the second reflector type lamp, and a reflector for a second reflector type lamp configured to reflect the light from the light-emitting element for the second reflector type lamp. The light-emitting element mounting unit for the second reflector type lamp may be disposed such that the light-emitting element for the second reflector type lamp emits a light in a direction which is opposite to a light-emitting direction of the light-emitting element for the reflector type lamp.

The light-emitting element for the reflector type lamp and the light-emitting element for the second reflector type lamp may emit lights with different colors, respectively.

The vehicular lamp may further include a third reflector type lamp unit. The third reflector type lamp unit may include a light-emitting element mounting unit for a third reflector type lamp configured to mount a light-emitting element for the third reflector type lamp, and a reflector for the third reflector type lamp configured to reflect the light from the light-emitting element for the third reflector type lamp. The light-emitting element mounting unit for the third reflector type lamp is disposed at the rear side of the reflector for the reflector type lamp such that the light-emitting element for the third reflector type lamp emits a light in a direction which is substantially the same as in the light-emitting element for the projector type lamp.

At least one of the light-emitting element mounting unit for the projector type lamp, the light-emitting element mounting unit for the reflector type lamp, the light-emitting element mounting unit for the second reflector type lamp, and the light-emitting element mounting unit for the third reflector type lamp may be mounted on a common base member.

According to the present disclosure, a vehicular lamp including a plurality of lamp units may be miniaturized.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof The illustrative embodiments described in the detailed description, drawing, and claims are not meant to be limiting. Other embodiments may be utilized, and other changes may be made, without departing from the spirit or scope of the subject matter presented here.

Hereinafter, the exemplary embodiments of the present disclosure will be described in detail with reference to the drawings.

First Exemplary Embodiment

Figure 1:
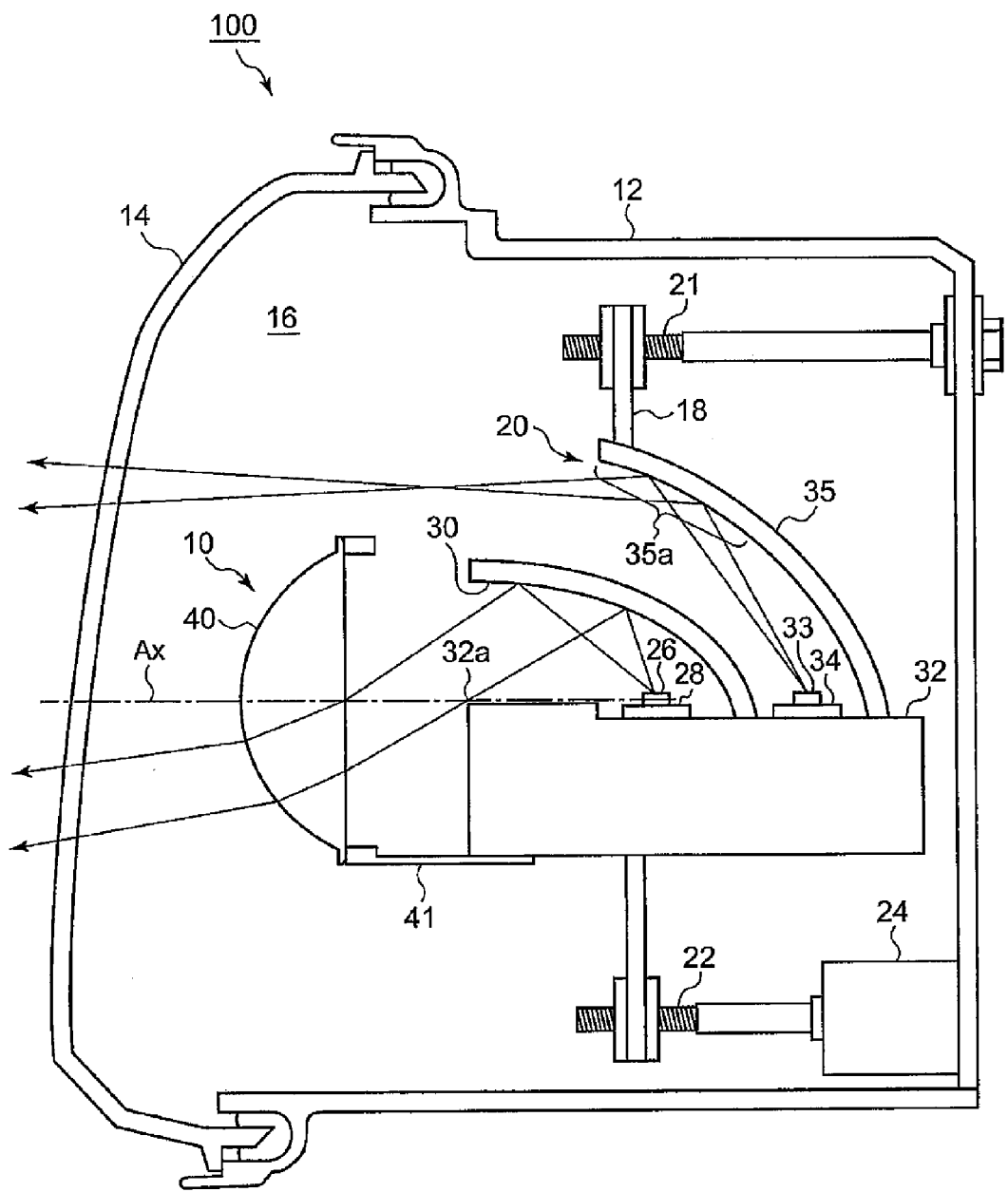
FIG. 1 is a cross-sectional view of a vehicular lamp according to a first exemplary embodiment of the present disclosure.

FIG. 1 is a cross-sectional view of a vehicular lamp according to a first exemplary embodiment of the present disclosure. A vehicular lamp 100 according to the first exemplary embodiment is a vehicular head lamp including a projector type lamp unit (also referred as to a "low-beam lamp") 10 having a function to irradiate a low-beam to the front side of the vehicle, and a reflector type lamp unit (also referred as to a "daytime running lamp") 20 having a function to be turned ON in a daytime in order to notify the presence of the vehicle to a pedestrian or an opposed vehicle.

As illustrated in FIG. 1, the vehicular lamp 100 includes a lamp body 12 having a concave portion opened at the front side of the lamp and a transparent cover 14 closing the opened surface of the lamp body 12. An inner space formed by the lamp body 12 and the cover 14 forms a lamp chamber 16.

The low-beam lamp 10 and the daytime running lamp 20 are disposed within the lamp chamber 16. In the present exemplary embodiment, the daytime running lamp 20 is disposed at the rear side of the low-beam lamp 10. The "rear side" means the rear side of the vehicular lamp 100 in the depth direction.

As illustrated in FIG. 1, the low-beam lamp 10 and the daytime running lamp 20 are attached to a substantially central portion of a bracket 18. A first aiming screw 21 is attached to the upper part of the bracket 18, and a second aiming screw 22 is attached to the lower part of bracket 18. The bracket 18 is supported on the lamp body 12 to be capable of tilting by the first aiming screw 21 and the second aiming screw 22. An aiming actuator 24 is provided on second aiming screw 22 of the lower side. When the aiming actuator 24 is driven, the low-beam lamp 10 and the daytime running lamp (DRL) 20 are tilted according to the tilting of the bracket 18, and thus, an optical-axis control (an aiming control) of an illuminating light is performed.

The low-beam lamp 10 includes an LED 26 for a low-beam ("low-beam LED 26"), a substrate 28 for a low-beam ("low-beam substrate 28") on which the low-beam LED 26 is mounted, a reflector 30 for a low-beam ("low-beam reflector 30") that reflects light from the low-beam LED 26 to the front side of the lamp, a base member 32 that supports the low-beam substrate 28, a projection lens 40, and a lens support member 41.

The low-beam LED 26 is a white light-emitting diode including a light-emitting unit (a light-emitting chip) with a size of about 1 mm by 1 mm, and disposed on the low-beam substrate 28 while a light exit surface thereof faces upward. The low-beam substrate 28 holds the low-beam LED 26 and supplies power to the low-beam LED 26.

The low-beam reflector 30 has a vertical cross-sectional shape which is a substantially oval shape, and a horizontal cross-sectional shape which is a free curved surface shape based on an oval. The low-beam reflector 30 is supported on the top surface of base member 32. The low-beam reflector 30 is disposed such that a first focal point thereof is in the vicinity of the light-emitting unit of the low-beam LED 26 and a second focal point thereof is in the vicinity of a front end 32a of the base member 32. The front end 32a of the base member 32 is configured to optionally cut the light reflected from the low-beam reflector 30 to form an inclined cut-off line on a light distribution pattern projected to the front side of the vehicle. That is, the front end 32a of the base member 32 serves as a shade that shields a part of the light from the low-beam reflector 30.

The projection lens 40 includes an incident surface on which a light emitted from the low-beam LED 26 and then reflected by the low-beam reflector 30 is incident and a light emitting surface that emits the light to the front side of the lamp. The projection lens 40 is a plano-convex aspheric lens in which the incident surface thereof is formed as a flat surface and the light emitting surface thereof is formed as a convex surface. The projection lens 40 is provided in front of the low-beam reflector 30 and supported by the lens support member 41. The optical axis Ax of the projection lens 40 is substantially parallel to the longitudinal direction of the vehicle. The optical axis Ax of the projection lens 40 becomes the optical axis of vehicular lamp 100. Further, the rear focal point of the projection lens 40 approximately coincides with the second focal point of the low-beam reflector 30. The projection lens 40 projects an image of a light source formed on the rear focal plane to the front side of the vehicular lamp 100 as an inverted image.

The daytime running lamp 20 includes an LED 33 for the DRL ("DRL LED 33"), a substrate 34 for the DRL ("DRL substrate 34") on which the DRL LED 33 is mounted, and a reflector 35 for the DRL ("DRL reflector 35").

The DRL LED 33 is a white light-emitting diode including a light-emitting unit with a size of about 1 mm by 1 mm. The DRL substrate 34 holds the DRL LED 33 and supplies power to the DRL LED 33. The DRL substrate 34 is supported on the top surface of the base member 32 which is common with the low-beam substrate 28. In the present exemplary embodiment, the DRL substrate 34 is disposed at the rear side of the low-beam reflector 30 such that the DRL LED 33 emits a light in a direction that intersects with the optical axis Ax, specifically upward in the vertical direction.

The DRL reflector 35 is provided at the rear side of the DRL substrate 34 and the DRL LED 33, and reflects the light from the DRL LED 33 to the front side of the lamp. The DRL reflector 35 is supported on the top surface of the base member 32. The reflecting surface of the DRL reflector 35 includes an extension area 35a which extends at least to the outer side of the projection lens 40 when viewed from the front. The DRL reflector 35 reflects at least a part of the light from the DRL LED 33 for to the extension area 35a to emit the light to the front side of the lamp through the outer side of the projection lens 40 as illustrated in FIG. 1.

In the present exemplary embodiment, the low-beam reflector 30 of the low-beam lamp 10 servers as a reflector that reflects the light from the low-beam LED 26 toward the projection lens 40, and also serves as a light shield body that prevents a light from the outside of the low-beam lamp 10 from being incident on the projection lens 40. "Preventing the light of the outside of the low-beam lamp 10 from being incident on the projection lens 40" means that a light other than the light emitted from the low-beam LED 26 is prevented from being incident on the projection lens 40. For example, in the present exemplary embodiment, since the daytime running lamp 20 is provided at the rear side of low-beam lamp 10, a light directed to the projection lens 40 exists among the direct lights form the DRL LED 33 and the reflected lights from the DRL reflector 35. As in the present exemplary embodiment, the direct lights from the DRL LED 33 and the reflected lights from the DRL reflector 35 are prevented from being incident on the projection lens 40 by the low-beam reflector 30, and thus, a desired low-beam light distribution pattern may be formed. Meanwhile, "the light from the outside of the low-beam lamp 10" is not limited to "the light from the daytime running lamp 20", and includes, for example, a light from other lamp unit (not illustrated) provided within the lamp chamber 16 of the vehicular lamp 100.

As described above, in the vehicular lamp 100 according to the present exemplary embodiment, the daytime running lamp 20 is disposed at the rear side of the low-beam lamp 10. From the arrangement where two lamp units having different functions are arranged side by side along the depth direction of the vehicular lamp 100, the size of the vehicular lamp in the width direction and/or the height direction of the vehicle may be decreased as compared to a case where these lamp units are arranged side by side along the width direction and/or the height direction of the vehicle.

Second Exemplary Embodiment

Figure 2:
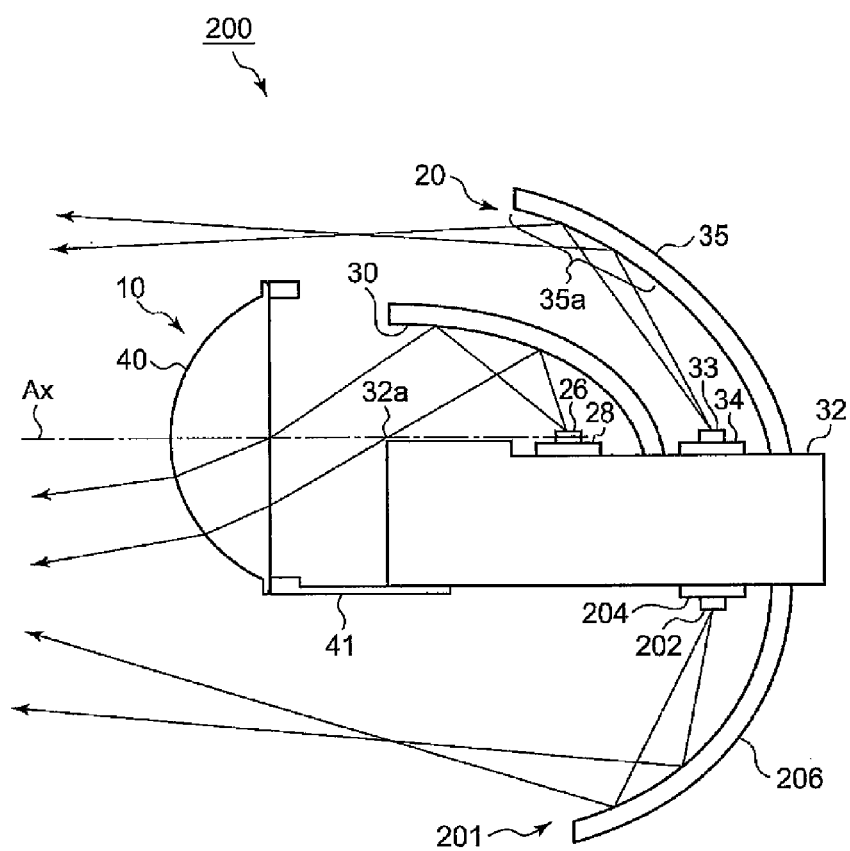
FIG. 2 is a cross-sectional view of a vehicular lamp according to a second exemplary embodiment of the present disclosure.

FIG. 2 is a cross-sectional view of a vehicular lamp according to a second exemplary embodiment of the present disclosure. A vehicular lamp 200 according to the second exemplary embodiment is a vehicular head lamp that includes a low-beam lamp 10, a daytime running lamp 20, and a turn signal lamp (TSL) 201. Meanwhile, the configuration of the low-beam lamp 10 and the daytime running lamp 20 in vehicular lamp 200 is the same as in the vehicular lamp 100 according to the first exemplary embodiment as illustrated in FIG. 1. Therefore, the same reference numerals are used and duplicated descriptions are appropriately omitted. Further, in FIG. 2, for example, the lamp body and the cover are not illustrated.

The vehicular lamp 200 according to the present exemplary embodiment is different from the vehicular lamp 100 according to the first exemplary embodiment as illustrated in FIG. 1 in that the turn signal lamp 201 is provided at the lower side of the low-beam lamp 10 and the daytime running lamp 20.

The turn signal lamp 201 is a reflector type lamp unit, and includes an LED 202 for the TSL ("TSL LED 202"), a substrate 204 for the TSL ("TSL substrate 204") on which the TSL LED 202 is mounted, and a reflector 206 for the TSL ("TSL reflector 206").

The TSL LED 202 is a yellow light-emitting diode including a light-emitting unit with a size of about 1 mm by 1 mm. The TSL substrate 204 holds the TSL LED 202 and supplies power to the TSL LED 202. The TSL substrate 204 is supported on the bottom surface of the base member 32 which is common with the low-beam substrate 28 and the DRL substrate 34. The TSL substrate 204 is disposed such that the TSL LED 202 emits a light in a direction which intersects with the optical axis Ax, specifically downward in the vertical direction. That is, the TSL substrate 204 is disposed such that the TSL LED 202 emits a light in a direction opposite to the light-emitting direction of the DRL LED 33.

The TSL reflector 206 reflects the light from the TSL LED 202 to the front side of the lamp. The TSL reflector 206 is supported on the bottom surface of the base member 32. The reflecting surface of the TSL reflector 206 extends to the outer side of the projection lens 40 when the vehicular lamp 200 is viewed from the front. The TSL reflector 206 reflects the light from the TSL LED 202 on the reflecting surface to emit the light to the front side of the lamp through the outer side of the projection lens 40 as illustrated in FIG. 2.

In the present exemplary embodiment, the lens support member 41 fixedly supports the low-beam lamp 10 and serves as a light shield body that prevents the reflected light from the TSL reflector 206 from being incident on the projection lens 40. The reflected light from the TSL reflector 206 is prevented from being incident on the projection lens 40 by the lens support member 41, and thus, a desired low-beam light distribution pattern may be formed.

As described above, in the vehicular lamp 200 according to the present exemplary embodiment, the daytime running lamp 20 is disposed at the rear side of low-beam lamp 10, and the turn signal lamp 201 is disposed at the lower side of the low-beam lamp 10 and the daytime running lamp 20. Therefore, the size of the vehicular lamp in the width direction of the vehicle may be decreased as compared to a case where these lamp units are arranged side by side in the width direction of the vehicle.

Third Exemplary Embodiment

Figure 3:
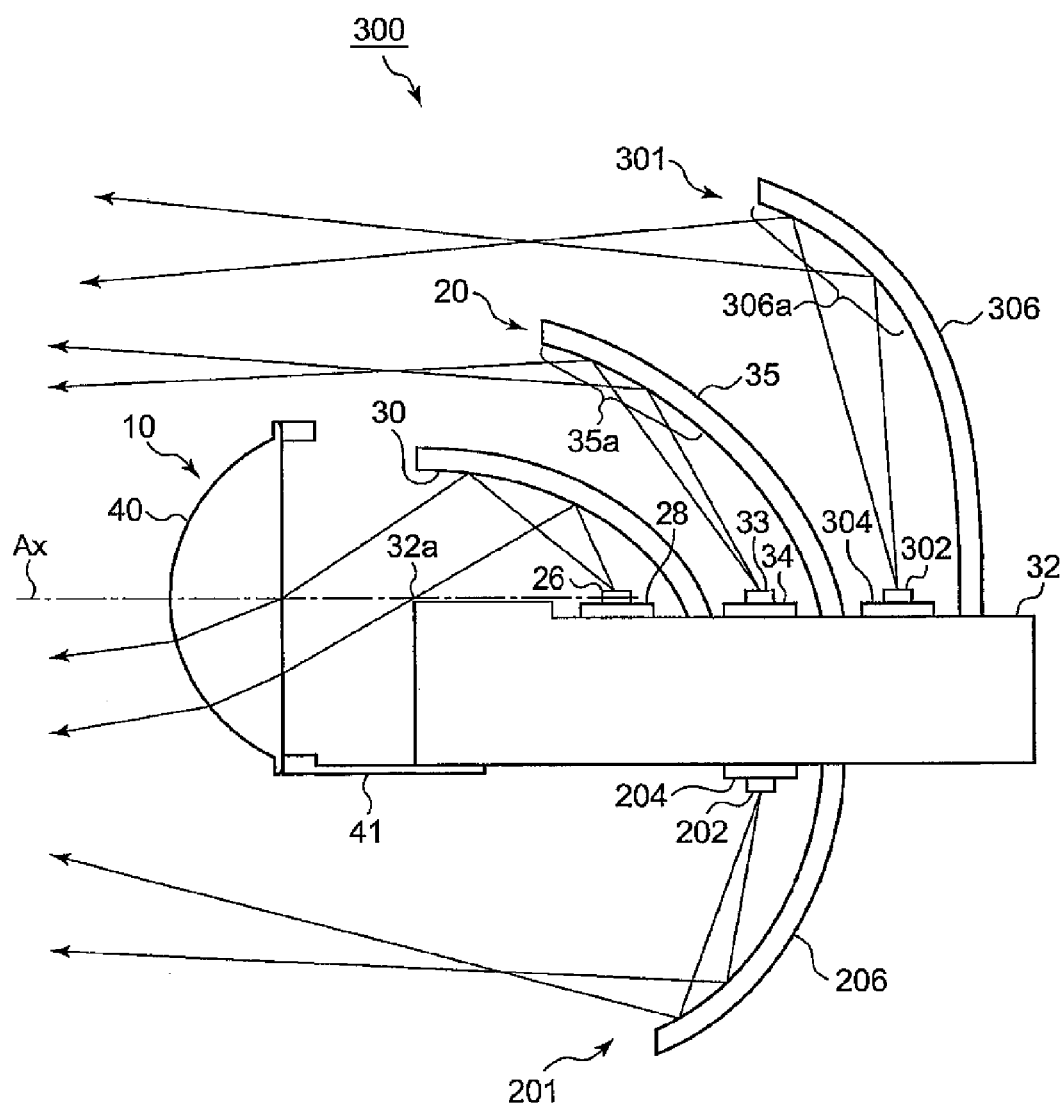
FIG. 3 is a cross-sectional view of a vehicular lamp according to a third exemplary embodiment of the present disclosure.

FIG. 3 is a cross-sectional view of a vehicular lamp according to a third exemplary embodiment of the present disclosure. A vehicular lamp 300 according to the third exemplary embodiment is a vehicular head lamp that includes a low-beam lamp 10, a daytime running lamp 20, a turn signal lamp 201, and a clearance lamp (CLL) 301. Meanwhile, the configuration of the low-beam lamp 10, the daytime running lamp 20 and the turn signal lamp 201 in the vehicular lamp 300 is the same as in the exemplary embodiments illustrated in FIGS. 1 and 2. Therefore, the same reference numerals are used and duplicated descriptions are appropriately omitted. Further, in FIG. 3, for example, the lamp body and the cover are not illustrated.

The vehicular lamp 300 according to the present exemplary embodiment is different from the vehicular lamp 200 according to the second exemplary embodiment as illustrated in FIG. 2 in that the clearance lamp 301 is provided at the rear side of the daytime running lamp 20.

The clearance lamp 301 is a reflector type lamp unit, and includes an LED 302 for the CLL ("CLL LED 302"), a substrate 304 for the CLL ("CLL substrate 304") on which the CLL LED 302 is mounted, and a reflector 306 for the CLL ("CLL reflector 306").

The CLL LED 302 is a white light-emitting diode including a light-emitting unit with a size of about 1 mm by 1 mm. The CLL substrate 304 holds the CLL LED 302 and supplies power to the CLL LED 302. The CLL substrate 304 is supported on the bottom surface of the base member 32 which is common with the low-beam substrate 28, the DRL substrate 34, and the TSL substrate 204. The CLL substrate 304 is disposed at the rear side of the DRL reflector 35 such that the CLL LED 302 emits a light in a direction that is the same as in the low-beam LED 26 and the DRL LED 33, that is, in a direction that intersects with the optical axis Ax.

The CLL reflector 306 reflects the light from the CLL LED 302 to the front side of the lamp. The CLL reflector 306 is supported on the top surface of the base member 32. The reflecting surface of the CLL reflector 306 includes an extension area 306a which extends to the outer side of the projection lens 40 and the outer side of the DRL reflector 35 when the vehicular lamp 300 is viewed from the front. The CLL reflector 306 reflects at least a part of the light from the CLL LED 302 to the extension area 306a to emit the light to the front side of the lamp through the outer side of the projection lens 40 and the outer side of the DRL reflector 35, as illustrated in FIG. 3.

In the present exemplary embodiment, the low-beam reflector 30 servers as a reflector that reflects the light from the low-beam LED 26 toward projection lens 40, and also serves as a light shield body that prevents the reflected lights from the DRL reflector 35 and the CLL reflector 306 from being incident to projection lens 40. As a result, a desired low-beam light distribution pattern may be formed.

As described above, in the vehicular lamp 300 according to the present exemplary embodiment, the daytime running lamp 20 is disposed at the rear side of the low-beam lamp 10, and the clearance lamp 301 is disposed at the rear side of the daytime running lamp 20. Further, the turn signal lamp 201 is disposed at the lower side of the low-beam lamp 10, the daytime running lamp 20, and the clearance lamp 301. Therefore, the size of the vehicular lamp in the width direction of a vehicle may be decreased as compared to a case where these lamp units are arranged side by side in the width direction of a vehicle.

Fourth Exemplary Embodiment

Figure 4:
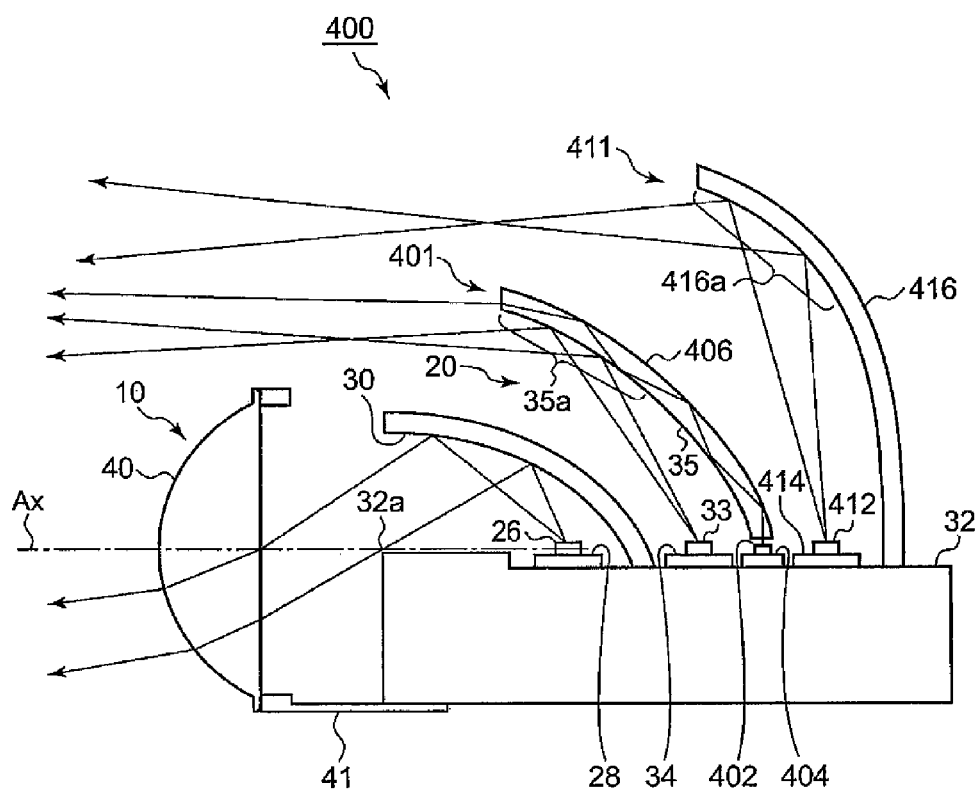
FIG. 4 is a cross-sectional view of a vehicular lamp according to a fourth exemplary embodiment of the present disclosure.

FIG. 4 is a cross-sectional view of a vehicular lamp according to a fourth exemplary embodiment of the present disclosure. A vehicular lamp 400 according to the fourth exemplary embodiment is a head lamp for a vehicle that includes a low-beam lamp 10, a daytime running lamp 20, a clearance lamp (CLL) 401, and a turn signal lamp (TSL) 411. Meanwhile, the configuration of the low-beam lamp 10 in the vehicular lamp 400 is the same as in the exemplary embodiments illustrated in FIG. 1. Therefore, the same reference numerals are used and duplicated descriptions are appropriately omitted. Further, in FIG. 4, for example, the lamp body and the cover are not illustrated.

In the vehicular lamp 400 according to the present exemplary embodiment, the daytime running lamp 20, the clearance lamp 401 and the turn signal lamp 411 are provided at the rear side of the low-beam lamp 10.

The clearance lamp 401 includes an LED 402 for the CLL ("CLL LED 402"), a substrate 404 for the CLL ("CLL substrate 404"), and a light guide 406.

The CLL LED 402 is a white light-emitting diode including a light-emitting unit with a size of about 1 mm by 1 mm. The CLL substrate 404 holds the CLL LED 402 and supplies power to the CLL LED 402. The CLL substrate 404 is supported on the top surface of the base member 32 at the rear side of the DRL substrate 34. The light guide 406 is formed of a transparent resin such as, for example, acryl or polycarbonate, and causes the light from the CLL LED 402 to be incident on one end thereof, to be guided while repeating internal reflection, and to be emitted from other end thereof toward the front side of the lamp.

In the present exemplary embodiment, the front side of the light guide 406 is deposited with aluminum, and serves as the DRL reflector 35 in the daytime running lamp 20. It is the same as in the first exemplary embodiment that the front side of the light guide 406 has an extension area 35a.

The turn signal lamp (TSL) 411 is provided at the rear side of the clearance lamp 401. The turn signal lamp 411 includes an LED 412 for the TSL ("TSL LED 412"), a substrate 414 for the TSL ("TSL substrate 414), and a reflector 416 for the TSL ("TSL reflector 416").

The TSL LED 412 is a yellow light-emitting diode including a light-emitting unit with a size of about 1 mm by 1 mm. The TSL substrate 414 holds the TSL LED 412 and supplies power to the TSL LED 412. The TSL substrate 414 is supported on the top surface of the base member 32. The TSL substrate 414 is disposed at the rear side of the CLL substrate 404 such that the TSL LED 412 emits a light in a direction that intersects with the optical axis Ax, specifically upward in the vertical direction.

The TSL reflector 416 reflects the light from the TSL LED 412 to the front side of the lamp. The TSL reflector 416 is supported on the top surface of the base member 32. The reflecting surface of the TSL reflector 416 includes an extension area 416a which extends to the outer side of projection lens 40 and the outer side of light guide 406 when the vehicular lamp 400 is viewed from the front. The TSL reflector 416 reflects at least a part of the light from the CLL LED 402 to the extension area 416a to emit the light to the front side of the lamp through the outer side of the projection lens 40 and the outer side of the light guide 406, as illustrated in FIG. 4.

As described above, in the vehicular lamp 400 according to the present exemplary embodiment, the daytime running lamp 20, the clearance lamp 401 and the turn signal lamp 411 are disposed at the rear side of the low-beam lamp 10. Further, the clearance lamp 401 is configured by a lamp unit using the light guide 406, and the front side of the light guide 406 serves as a reflector of the daytime running lamp 20 by depositing aluminum thereon. Therefore, the size of the vehicular lamp in the width direction and the height direction of the vehicle may be decreased as compared to a case where these lamp units are arranged side by side in the width direction and the height direction of the vehicle.

Fifth Exemplary Embodiment

Figure 5:
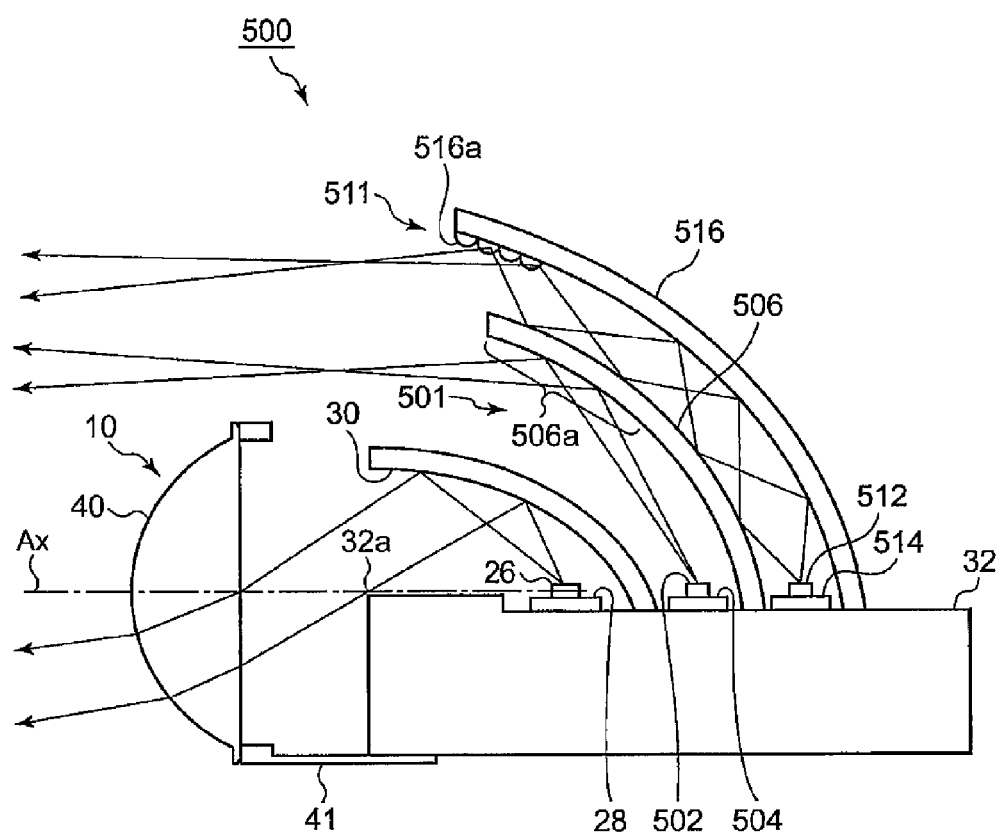
FIG. 5 is a cross-sectional view of a vehicular lamp according to a fifth exemplary embodiment of the present disclosure.

FIG. 5 is a cross-sectional view of a vehicular lamp according to a fifth exemplary embodiment of the present disclosure. A vehicular lamp 500 according to the fifth exemplary embodiment is a head lamp for a vehicle that includes a low-beam lamp 10, a turn signal lamp (TSL) 501, and a clearance lamp (CLL) 511. Meanwhile, the configuration of the low-beam lamp 10 in the vehicular lamp 500 is the same as in the exemplary embodiment illustrated in FIG. 1. Therefore, the same reference numerals are used and duplicated descriptions are appropriately omitted. Further, in FIG. 5, for example, the lamp body and the cover are not illustrated.

In the vehicular lamp 500 according to the present exemplary embodiment, the turn signal lamp 501 and the clearance lamp 511 are provided at the rear side of the low-beam lamp 10.

The turn signal lamp 501 includes an LED 502 for the TSL ("TSL LED 502), a substrate 504 for the TSL ("TSL substrate 504"), and a reflector 506 for the TSL ("TSL reflector 506").

The TSL LED 502 is a yellow light-emitting diode including a light-emitting unit with a size of about 1 mm by 1 mm. The TSL substrate 504 holds the TSL LED 502 and supplies power to the TSL LED 502. The TSL substrate 504 is supported on the top surface of the base member 32. The TSL substrate 504 is disposed at the rear side of the low-beam reflector 30 such that the TSL LED 502 emits a light in a direction which is the same as in the low-beam LED 26, that is, in a direction that intersects with the optical axis Ax.

The TSL reflector 506 reflects the light from the TSL LED 502 to the front side of the lamp. The TSL reflector 506 is supported on the top surface of the base member 32. The reflecting surface of the TSL reflector 506 includes an extension area 506a which extends to the outer side of the projection lens 40 when the vehicular lamp 500 is viewed from the front. The TSL reflector 506 reflects at least a part of the light from the TSL LED 502 to the extension area 506a to emit the light to the front side of the lamp through the outer side of the projection lens 40 as illustrated in FIG. 5.

The clearance lamp 511 includes an LED 512 for the CLL ("CLL LED 512"), a substrate 514 for the CLL ("CLL substrate 514"), and a reflector 516 for the CLL ("CLL reflector 516"). The CLL LED 512 is a white light-emitting diode including a light-emitting unit with a size of about 1 mm by 1 mm. The CLL substrate 514 holds the CLL LED 512 and supplies power to the CLL LED 512. The CLL substrate 514 is supported on the top surface of the base member 32. The CLL substrate 514 is disposed at the rear side of the TSL reflector 506 such that the CLL LED 512 emits a light in a direction which is the same as in the low-beam LED 26, that is, in a direction that intersects with the optical axis Ax.

In the present exemplary embodiment, the light emitted from the CLL LED 512 is repeatedly reflected between the front surface of the CLL reflector 516 and the rear surface of the TSL reflector 506 to be guided in the space. Then, the light is emitted to the front side of the lamp. Steps 516a are formed in the front end portion of the CLL reflector 516 which refracts and/or reflects the light guided in the space to form a predetermined light distribution pattern of the clearance lamp.

As described above, in the vehicular lamp 500 according to the present exemplary embodiment, the turn signal lamp 501 and the clearance lamp 511 are disposed at the rear side of the low-beam lamp 10. Further, the present exemplary embodiment is configured such that the light emitted from the CLL LED 512 is guided in the space between the front surface of the CLL reflector 516 and the rear surface of the TSL reflector 506, and then to be emitted to the front side of the lamp. Accordingly, since the CLL reflector 516 may be disposed in the front side as compared to a case where the reflector for a CLL is used alone, the size in the depth direction of the vehicular lamp may be reduced.

Sixth Exemplary Embodiment

Figure 6:
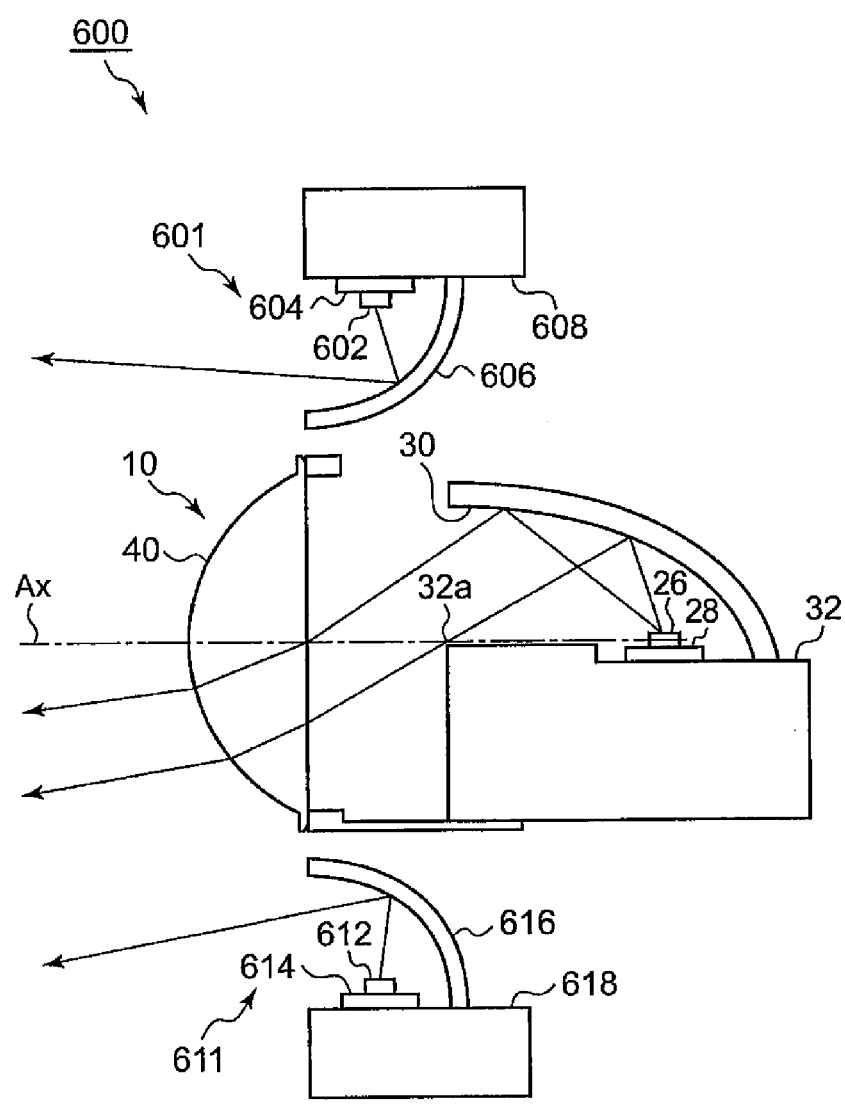
FIG. 6 is a cross-sectional view of a vehicular lamp according to a sixth exemplary embodiment of the present disclosure.

FIG. 6 is a cross-sectional view of a vehicular lamp according to a sixth exemplary embodiment of the present disclosure. A vehicular lamp 600 according to the sixth exemplary embodiment is a vehicular head lamp that includes a low-beam lamp 10, a clearance lamp (CLL) 601, and a turn signal lamp (TSL) 611. Meanwhile, the configuration of the low-beam lamp 10 in the vehicular lamp 600 is the same as in the exemplary embodiment illustrated in FIG. 1. Therefore, the same reference numerals are used and duplicated descriptions are appropriately omitted. Further, in FIG. 6, for example, the lamp body and the cover are not illustrated.

As illustrated in FIG. 6, in the vehicular lamp 600 according to the present exemplary embodiment, the clearance lamp 601 is disposed at the upper side of the low-beam lamp 10, and the turn signal lamp 611 is disposed at the lower side of the low-beam lamp 10.

The clearance lamp 601 includes an LED 602 for the CLL ("CLL LED 602"), a substrate 604 for the CLL ("CLL substrate 604"), and a reflector 606 for the CLL ("CLL reflector 606"). The CLL LED 602 is a white light-emitting diode including a light-emitting unit with a size of about 1 mm by 1 mm. The CLL substrate 604 holds the CLL LED 602 and supplies power to the CLL LED 602. The CLL substrate 604 is supported on the bottom surface of a second base member 608 which is disposed at the upper side of the low-beam lamp 10. The CLL substrate 604 is disposed such that the CLL LED 602 emits light downward.

The CLL reflector 606 reflects the light from the CLL LED 602 to the front side of the lamp. The CLL reflector 606 is supported on the bottom surface of the second base member 608. The reflecting surface of the CLL reflector 606 extends to the vicinity of the peripheral edge portion of the projection lens 40. The CLL reflector 606 reflects the light from the CLL LED 602 to emit the light to the front side of the lamp through the outer side of the projection lens 40.

The turn signal lamp 611 includes an LED 612 for the TSL ("TSL LED 612"), a substrate 614 for the TSL ("TSL substrate 614"), and a reflector 616 the TSL ("TSL reflector 616"). The TSL LED 612 is a yellow light-emitting diode including a light-emitting unit with a size of about 1 mm by 1 mm. The TSL substrate 614 holds the TSL LED 612 and supplies power to the TSL LED 612. The TSL substrate 614 is supported on the top surface of a third base member 618 which is disposed at the lower side of the low-beam lamp 10. The TSL substrate 614 is disposed such that the TSL LED 612 emits light upward.

The TSL reflector 616 reflects light from the TSL LED 612 to the front side of the lamp. The TSL reflector 616 is supported on the top surface of the third base member 618. The reflecting surface of the TSL reflector 616 extends to the vicinity of the peripheral edge portion of the projection lens 40. The TSL reflector 616 reflects the light from the TSL LED 612 to emit the light to the front side of the lamp through the outer side of the projection lens 40.

As illustrated in FIG. 6, in the vehicular lamp 600 according to the present exemplary embodiment, the clearance lamp 601 is disposed at the upper side of the low-beam lamp 10, and the turn signal lamp 611 is disposed at the lower side of the low-beam lamp 10. Therefore, the peripheral edge of the low-beam lamp 10 may be lighted up. Accordingly, the size of the vehicular lamp in the width direction of the vehicle may be decreased as compared to a case where the lamp units having different functions are arranged side by side in the width direction of the vehicle.

Hereinbefore, the present disclosure is described based on the exemplary embodiments. These exemplary embodiments are merely illustrative, and a person skilled in the related art will appreciate that various modifications may be made in a combination of individual components or individual processing processes and the modifications belong to the scope of the present disclosure.

For example, the low-beam lamp of the above-described exemplary embodiments is configured such that the light from the low-beam LED is reflected from the low-beam reflector, and then is emitted from the projection lens. However, the configuration of the low-beam lamp is not limited thereto. For example, a configuration may be applied where a direct light from the low-beam LED is subjected to a deflection control at the projection lens and emitted. In this case, a light shield body may be provided separately to prevent the light of the outside of the low-beam lamp from being incident on the projection lens.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp comprising:
a projector type lamp unit including a light-emitting element mounting unit for a projector type lamp configured to mount a light-emitting element for the projector type lamp, a projection lens configured to project light from the light-emitting element for the projector type lamp to the front side, and a light shield body configured to prevent a light from the outside from being incident on the projection lens and reflect the light from the light-emitting element for the projector type lamp to the projection lens; and
a reflector type lamp unit including a light-emitting element mounting unit for a reflector type lamp configured to mount a light-emitting element for the reflector type lamp, and a reflector for the reflector type lamp configured to reflect the light from the light-emitting element for the reflector type lamp, wherein the light-emitting element mounting unit for the reflector type lamp is disposed at a rear side of the light shield body of the projector type lamp unit in a depth direction of the vehicular lamp along with an optical axis of the vehicular lamp, and the reflector for the reflector type lamp includes an extension area that extends to at least the outer side of the projection lens when viewed from the front, and reflects the light from the light-emitting element for the reflector type lamp in the extension area to emit the light to the front side of the lamp unit through the outer side of the projection lens.

2. The vehicular lamp of claim 1, further comprising a second reflector type lamp unit, wherein the second reflector type lamp unit includes a light-emitting element mounting unit for a second reflector type lamp configured to mount a light-emitting element for the second reflector type lamp, and a reflector for the second reflector type lamp configured to reflect the light from the light-emitting element for the second reflector type lamp, and the light-emitting element mounting unit for the second reflector type lamp is disposed such that the light-emitting element for the second reflector type lamp emits a light in a direction which is opposite to a light-emitting direction of the light-emitting element for the reflector type lamp.

3. The vehicular lamp of claim 2, wherein the light-emitting element for the reflector type lamp and the light-emitting element for the second reflector type lamp emit lights with different colors, respectively.

4. The vehicular lamp of claim 3, further comprising a third reflector type lamp unit, wherein the third reflector type lamp unit includes a light-emitting element mounting unit for a third reflector type lamp configured to mount a light-emitting element for the third reflector type lamp, and a reflector for the third reflector type lamp configured to reflect the light from the light-emitting element for the third reflector type lamp, and the light-emitting element mounting unit for the third reflector type lamp is disposed at the rear side of the reflector for the reflector type lamp such that the light-emitting element for the third reflector type lamp emits light in a direction which is substantially the same as in the light-emitting element for the projector type lamp.

5. The vehicular lamp of claim 4, wherein at least one of the light-emitting element mounting unit for the projector type lamp, the light-emitting element mounting unit for the reflector type lamp, the light-emitting element mounting unit for the second reflector type lamp, and the light-emitting element mounting unit for the third reflector type lamp is mounted on a common base member.

6. The vehicular lamp of claim 2, further comprising a third reflector type lamp unit, wherein the third reflector type lamp unit includes a light-emitting element mounting unit for a third reflector type lamp configured to mount a light-emitting element for the third reflector type lamp, and a reflector for the third reflector type lamp configured to reflect the light from the light-emitting element for the third reflector type lamp, and the light-emitting element mounting unit for the third reflector type lamp is disposed at the rear side of the reflector for the reflector type lamp such that the light-emitting element for the third reflector type lamp emits a light in a direction which is substantially the same as in the light-emitting element for the projector type lamp.

7. The vehicular lamp of claim 6, wherein at least one of the light-emitting element mounting unit for the projector type lamp, the light-emitting element mounting unit for the reflector type lamp, the light-emitting element mounting unit for the second reflector type lamp, and the light-emitting element mounting unit for the third reflector type lamp is mounted on a common base member.

* * * * *